No. 894,194. PATENTED JULY 28, 1908.
G. W. DE CLEMENTS.
CAR FENDER.
APPLICATION FILED JAN. 27, 1908.
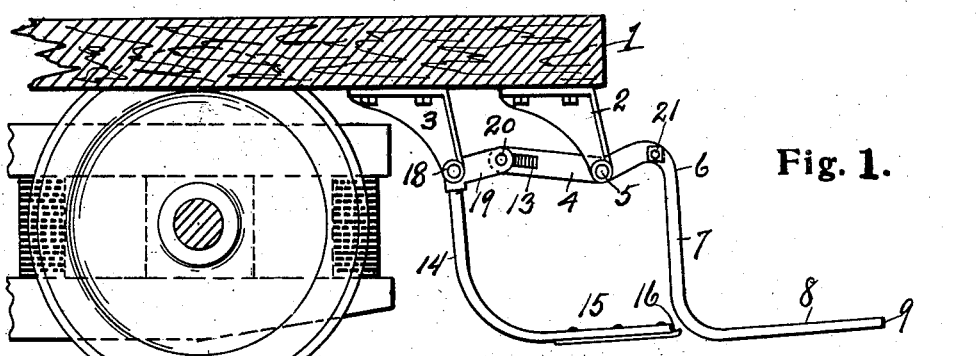
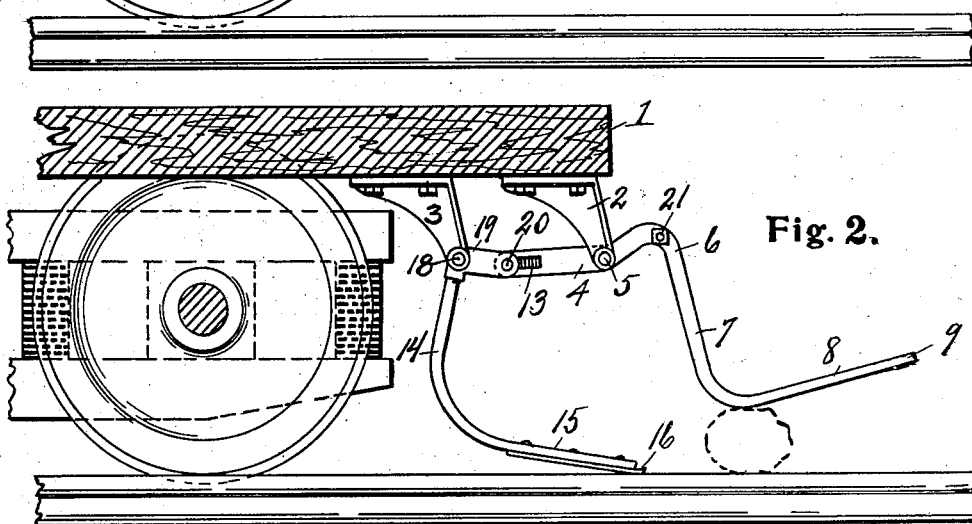
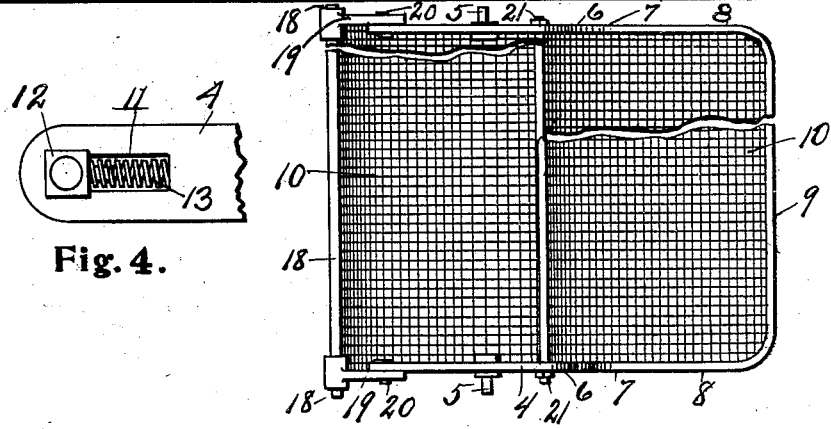
Fig. 4.
Fig. 3.
Witnesses
Inventor
George W. De Clements.
By
Attorneys

UNITED STATES PATENT OFFICE.

GEORGE W. DE CLEMENTS, OF KALAMAZOO, MICHIGAN, ASSIGNOR OF ONE-HALF TO JOSEPH SALOMON, OF CHICAGO, ILLINOIS.

CAR-FENDER.

No. 894,194.  Specification of Letters Patent.  Patented July 28, 1908.

Application filed January 27, 1908. Serial No. 412,696.

*To all whom it may concern:*

Be it known that I, GEORGE W. DE CLEMENTS, a citizen of the United States, residing at Kalamazoo, in the county of Kalamazoo, State of Michigan, have invented certain new and useful Improvements in Car-Fenders; and I do declare the following to be a full, clear, and exact description of the invention, such as will enable others skilled in the art to which it appertains to make and use the same, reference being had to the accompanying drawings, and to the figures of reference marked thereon, which form a part of this specification.
This invention relates to new and useful improvements in car fenders, especially designed for use in connection with street-cars and other surface cars propelled by mechanical means, and consists in the construction and arrangement of parts hereinafter more fully set forth and pointed out particularly in the claims.

The object of the invention is to provide a main fender and an auxiliary fender so mounted on the car and operatively associated as to cause a depression of the auxiliary fender should the main fender become raised by an object passing thereunder, the arrangement being such that when the auxiliary fender is depressed, an object on the track is prevented from passing under the wheels or the truck of the car.

The above object is attained by the structure illustrated in the accompanying drawings, in which:—

Figure 1 is an elevation showing my fender mounted on the forward end of the platform or frame of a car, which together with the axle, appears in section. Fig. 2 is a similar view showing the position of the main and auxiliary fenders when the main fender is raised by an object thereunder. Fig. 3 is a fragmentary view in plan with the parts in the position shown in Fig. 1. Fig. 4 is an enlarged detail of the rear end of one of the side bars of the main fender, showing a slot and a movable bearing block therein and a spring for normally retaining said block in place.
Referring to the characters of reference, 1 designates the platform, or car frame to the under face of which on each side are bolted the depending brackets 2 and 3 respectively. The forward or main fender frame consists of the side bars 4 which are pivoted upon the pins 5 supported in the brackets 2. Said bars some distance forward of their point of pivot curve downwardly, as at 6, forming the vertical side portions 7 which at their lower ends are joined to the horizontally extending portions 8 that are in turn connected at their forward ends by the front guard rail 9. Connecting the upper ends of the vertical portions of said side bars is a transverse tie rod 21. Suitably attached to the frame of the main fender so as to be supported thereby, is a netting 10 which may be of any desirable construction. The rear ends of each of the side bars 4 are provided with a longitudinal slot 11 in which is located a slidable box 12. Confined in said slot and bearing against said box is a compressible spring 13.

The secondary or auxiliary fender frame comprises the downwardly curved side bars 14 terminating in the forwardly projecting horizontal portions 15 connected at their forward ends by the transverse guard rail 16. The auxiliary fender frame carries a suitable netting 17. The side bars 14 of the auxiliary frame at their upper ends are pivoted upon a transverse rod 18 which is supported by the brackets 3. The upper ends of the side bars of the auxiliary frame are provided with the forwardly projecting horizontal portions 19 which are nearly at right angles to the side bars 14 and each of which carries in the free end thereof a pivot pin 20 which enters and is journaled in the box 12 in the adjacent end of the corresponding side bar 4 of the main fender frame. By this arrangement the fender frames are operatively associated so that upon the raising of the main fender, the auxiliary fender will be actuated to cause its forward lower end to move downwardly into contact with the track in such position as to receive thereon any object which might pass under the forward fender, as will be seen on referring to Fig. 2, wherein the forward fender is shown raised by an object thereunder, illustrated by dotted lines. It will be understood that because of the pivotal connection between the end portions of the side bars of the fender frames, as the forward frame is raised, it will swing upon the pivot or fulcrum 5, thereby depressing the inwardly extending ends of the side bars thereof, which bars being connected wtih the forwardly extending portions 19 of the side bars of the auxiliary frame, will swing said frame upon the pivot or fulcrum 18 so as to depress its forward end and carry it into contact with the track.

It will be noted that when the fender frames are in their normal position, as shown in Fig. 1, the pivotal point 20 between the projecting end portions of the side bars of said frames stands above a right line through the centers of oscillation or points of pivot upon which said frames swing, so that as the pivotally joined end portions of the frames swing downwardly as the forward fender frame is raised, provision must be made for longitudinal movement of the pivot pin 20 by means of which the end portions of said frames are connected. This is accomplished as before stated, by means of the movable blocks 12 lying in the slots 11 of the rearwardly extending end portions of the side bars 4 backed by the compressible springs 13. As the pivoted end portions of the frames swing downwardly into horizontal alinement with the pivotal points 5 and 18, said blocks 12 slide longitudinally in the slots 11 against the resistance of the springs 13. When the pivotal points 20 shall have passed below a center line through the points of fulcrum 5 and 18, the tendency of the springs 13 will be to maintain the parts in said position, preventing the forward frame when raised from dropping and requiring the application of pressure to the raised end thereof to swing the parts back to their normal position shown in Fig. 1. By means of this arrangement the forward or main fender frame will not drop after an object has passed thereunder and before the object can be picked up by the rear or auxiliary frame.

It will be noted that the side bars 4 of the main frame extend some distance forward of the point of pivot before curving downwardly to form the vertical side portions 7. This arrangement insures the application of the lifting force at a point forward of the fulcrum 5, preventing the possibility of an upward pressure directly in alinement with said point of fulcrum, as might result in case the side bars 7 extended downwardly in vertical alinement with said fulcrum point. It will now be apparent that by means of this arrangement of main and auxiliary fenders operatively coupled, as shown and described, an object passing under the main fender of such size as to raise it, cannot pass under the car truck or come in contact with the wheels owing to the depression of the auxiliary fender in advance of the wheels and truck and in the rear of said object.

Having thus fully set forth my invention, what I claim as new and desire to secure by Letters Patent, is:—

1. In a fender attachment for cars, the combination with the car frame, of a main forward fender pivoted to said frame having side bars extending rearwardly of the point of pivot, an auxiliary fender pivoted to said frame in the rear of the forward fender having side bars provided with end portions extending forward of the point of pivot thereof, the rear ends of the side bars of the forward fender and the forward ends of the side bars of the rear fender being directly connected by a movable pivot, whereby the auxiliary fender is depressed simultaneously with the raising of the main fender.

2. In a fender attachment for cars, the combination with the car frame, of a main fender having side bars pivoted to the car frame, said side bars extending rearwardly of the point of pivot, an auxiliary fender pivoted to the car frame in the rear of the forward fender having side bars provided with end portions extending forwardly of the point of pivot thereof, the rear ends of the side bars of the forward fender having longitudinal slots therein, sliding boxes in said slots, compressible springs engaging said boxes and pivot pins connecting the forward ends of the side bars of the rear fender directly to said sliding boxes.

3. In a fender attachment for cars, the combination with a car frame, of a main fender having side bars pivoted to the car frame, said side bars extending forwardly and rearwardly of the point of pivot and having vertical portions extending downwardly from the terminals of the portions of the side bars extending forwardly of the pivots, an auxiliary fender in the rear of the main fender pivoted to the car frame and having side bars provided with end portions extending forwardly of the point of pivot of said rear fender, the forwardly extending end portions of the side bars of the auxiliary fender being directly connected to the rearwardly extending end portions of the side bars of the forward fender by a movable pivot, and means for placing the pivotal union between said side bars under spring tension.

4. In a fender attachment for cars, the combination with a car frame, of a main fender pivoted to said frame having side bars provided with end portions extending rearwardly of said point of pivot, an auxiliary fender in the rear of the main fender also pivoted to the car frame, and having side bars provided with end portions extending forward of its point of pivot, the projecting ends of the side bars of said fenders being pivotally connected upon a movable pivot and the pivotal point of union between the ends of said bars being normally above a horizontal line through the pivotal points on which the fenders swing.

In testimony whereof, I sign this specification in the presence of two witnesses.

GEORGE W. DE CLEMENTS.

Witnesses:
JOHN H. NOTLEY,
JOHN L. HOLLANDER.